US006661940B2

(12) United States Patent
Kim

(10) Patent No.: US 6,661,940 B2
(45) Date of Patent: Dec. 9, 2003

(54) APPARATUS AND METHOD FOR REBROADCASTING SIGNALS IN AN OPTICAL BACKPLANE BUS SYSTEM

(75) Inventor: Gicherl Kim, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 126 days.

(21) Appl. No.: 09/907,375

(22) Filed: Jul. 18, 2001

(65) Prior Publication Data

US 2002/0021855 A1 Feb. 21, 2002

Related U.S. Application Data

(60) Provisional application No. 60/219,986, filed on Jul. 21, 2000.

(51) Int. Cl.[7] .............................. G02B 6/28; G02B 6/22; H04B 10/12
(52) U.S. Cl. .............................. 385/15; 385/14; 385/37; 385/129; 385/24; 359/15; 359/163; 359/34
(58) Field of Search ................................ 385/14, 15, 18, 385/24, 31, 37, 39, 42, 47, 129, 130, 131; 359/15, 34, 127, 128, 130, 163, 174, 179, 152, 195

(56) References Cited

U.S. PATENT DOCUMENTS

| | | | | |
|---|---|---|---|---|
| 5,245,680 A | * | 9/1993 | Sauter .............................. 385/24 |
| 5,362,961 A | * | 11/1994 | Hamanaka .................... 250/216 |
| 5,726,788 A | | 3/1998 | Fee et al. | |
| 5,812,708 A | | 9/1998 | Rao | |
| 5,822,475 A | * | 10/1998 | Hirota et al. .................... 385/24 |
| 5,832,147 A | | 11/1998 | Yeh et al. | |
| 5,889,903 A | | 3/1999 | Rao | |
| 5,923,451 A | * | 7/1999 | Karstensen et al. .......... 359/163 |
| 5,995,262 A | * | 11/1999 | Hirota et al. ................ 359/163 |
| 6,021,243 A | | 2/2000 | Fasanella et al. | |
| 6,038,048 A | * | 3/2000 | Harris et al. ................ 359/159 |
| 6,058,228 A | | 5/2000 | Fasanella et al. | |
| 6,125,217 A | | 9/2000 | Paniccia et al. | |
| 6,215,585 B1 | * | 4/2001 | Yoshimura et al. ......... 359/344 |
| 6,236,778 B1 | | 5/2001 | Laughlin | |
| 6,317,242 B1 | * | 11/2001 | Ozeki et al. ................ 359/163 |
| 6,343,171 B1 | * | 1/2002 | Yoshimura et al. ........... 385/50 |
| 6,366,375 B1 | * | 4/2002 | Sakai et al. .................. 359/115 |

OTHER PUBLICATIONS

"Bi–Directional Optical Backplane Bus for Board Optoelectronic Interconnects" Gicherl Kim, Jinhuai Fa and Ray T. Chen, found at http://www.ece.utexas.edu/projects/ece/mrc/groups/optic–inter/project.optbus.html, Optical Interconnects Group, University of Texas at Austin, 5 pp.

"Design and performance of a multiprocessor system employing board–to–board free–space interconnections: COSINE–1," T. Sakano, T. Matusumoto, K. Noguchi, and T. Sawabe, Appl. Opt. 30, pp. 2334–2343.

(List continued on next page.)

Primary Examiner—Brian Healy
Assistant Examiner—Kevin S. Wood
(74) Attorney, Agent, or Firm—Workman Nydegger

(57) ABSTRACT

An apparatus and method are provided for communicating optical signals between components attached to an optical backplane bus. Each component has a respective active coupler to receive and transmit optical signals through a waveguiding plate. Multiplexed polymeric holograms may be used to couple or direct optical signals between the components and the waveguiding plate. Optical signals received from any component may be rebroadcast to all other components by a distributor and its active coupler using a doubly multiplexed hologram. The distributor and its active coupler may be located proximate a midpoint of the waveguiding plate.

25 Claims, 5 Drawing Sheets

OTHER PUBLICATIONS

"Three–dimensional board–to–board free space optical interconnects and their application to the prototype multiprocessor: COSINE–III," Sakano, T. Matusumoto, and K. Noguchi, Appl. Opt. 34, pp. 1815–1822.

"Optoelectronic interconnection based on a light–guiding plate with holographic coupling elements," H. J. Haumann, H. Kobolla, F. Sauer, J. Schmidt, J. Schwider, W. Stork, N. Streibl, and R. Volkel, Opt. Eng. 30, pp. 1620–1623.

"Bi–directional optical backplane bus for general purpose mulitprocessor board–to–board optoelectronic interconnects," S. Natarajan, C. Zhao, and R. T. Chen, J. Lightwave Technology, 13, pp. 1031–1040.

"Cross–link optimized cascaded volume hologram array with energy equalized one–to–many surface–normal fan–outs," J. Liu, C. Zhao, R. Lee, and R. T. Chen, Opt. Lett., 22, pp. 1024–1026.

"Hybrid free space–optical bus system for board–to–board interconnections," J. Yeh, R. K. Kostuk, and K. Tu, App. Opt. 35, pp. 6354–6364.

"Substrate–mode holograms used in optical interconnects: design issues," J. Yeh, and R. K. Kostuk, Appl. Opt., 34, pp. 3152–3164.

"Design Considerations for Gigabit Backplane Systems Tutorial", found at http://www.iec.org/tutorials/design_backplaine/topic01.html?Next.x=32&Next.y=15, 5 pp.

* cited by examiner

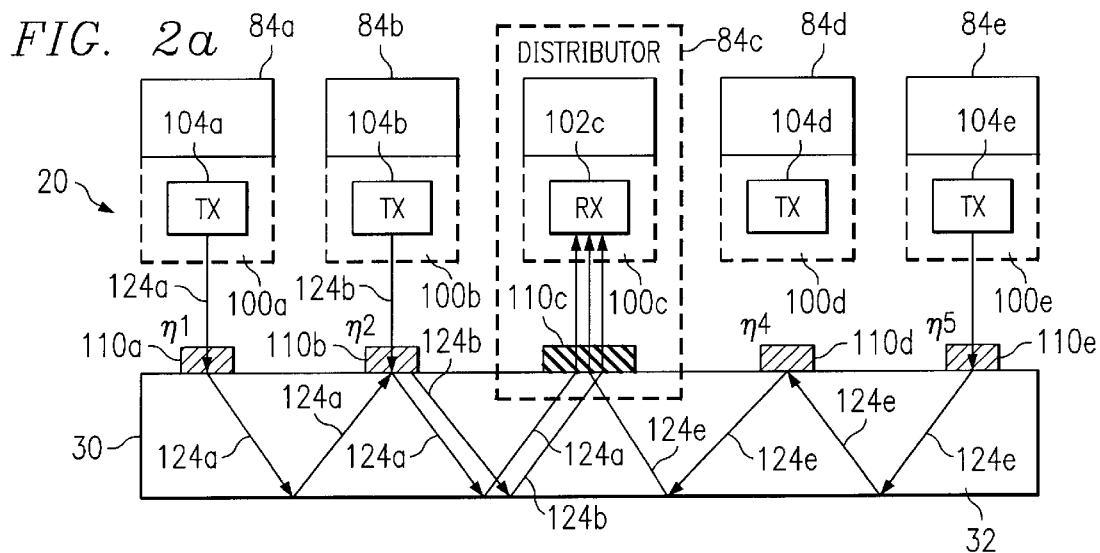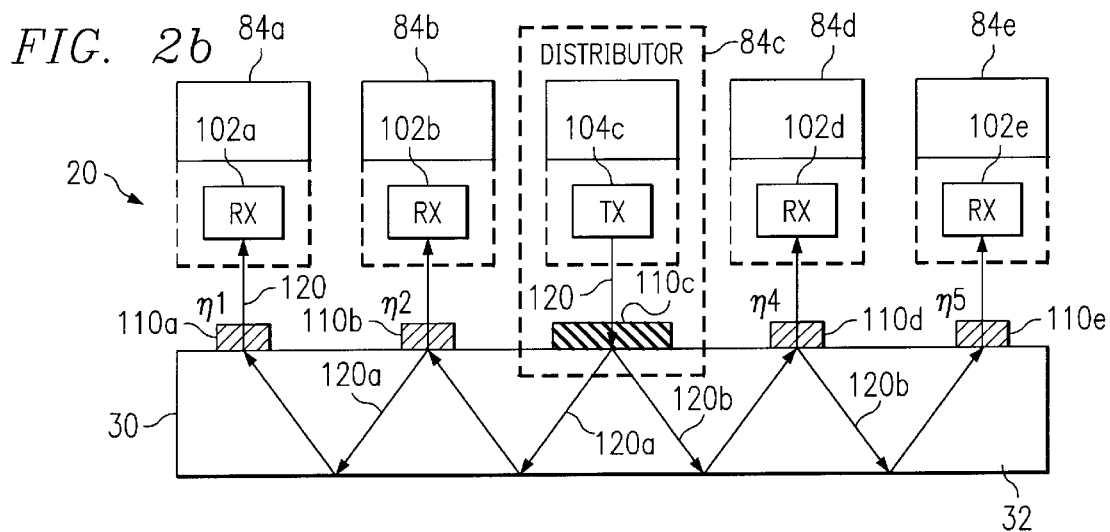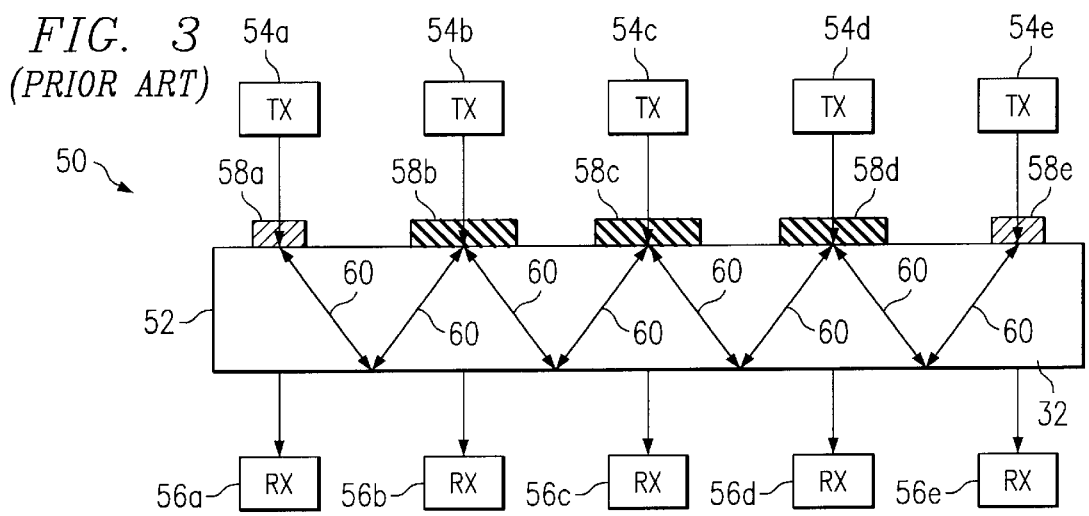

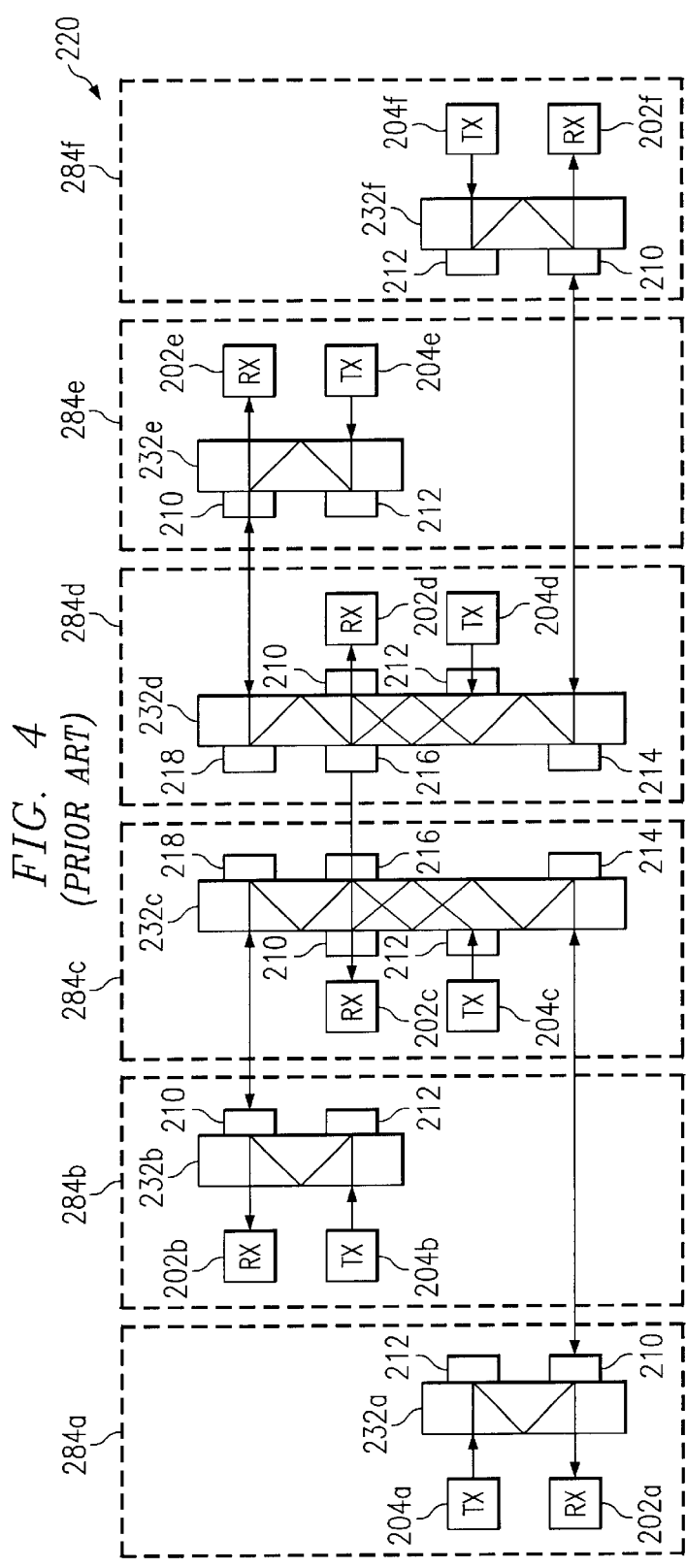
FIG. 4 (PRIOR ART)
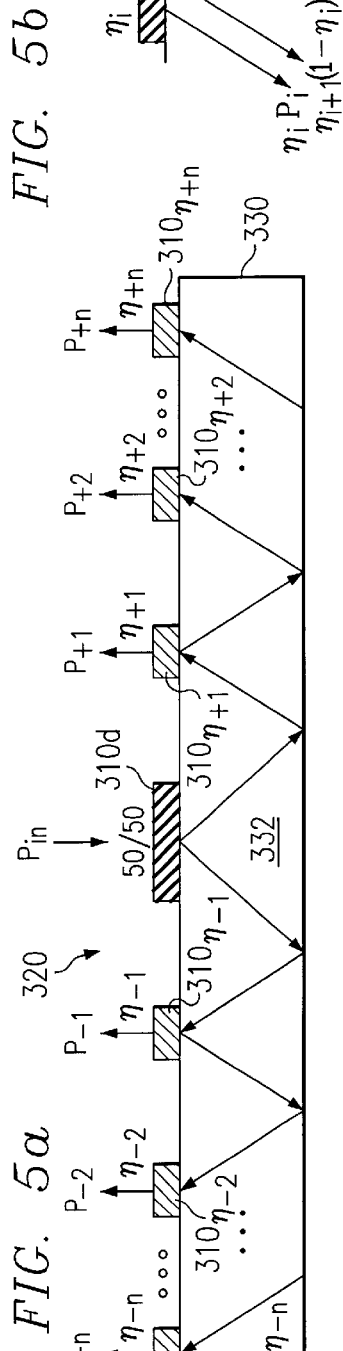
FIG. 5a
FIG. 5b

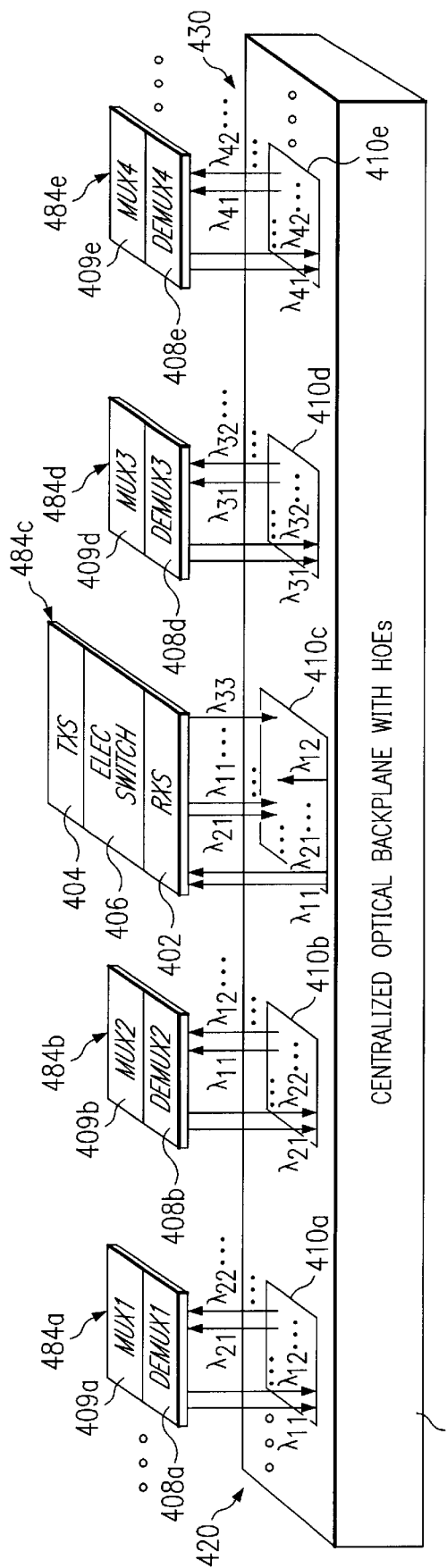
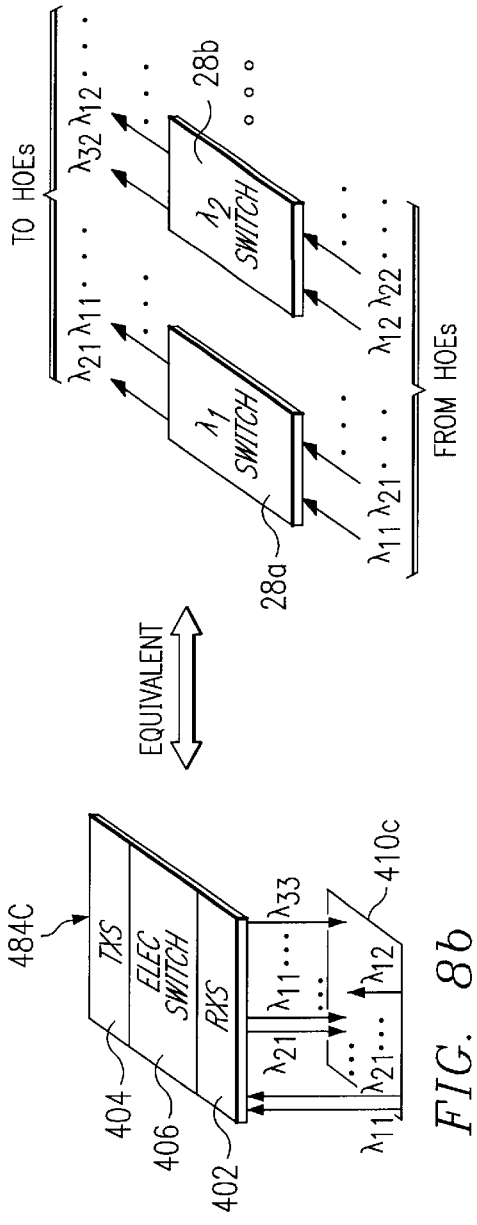
FIG. 8a
FIG. 8b

APPARATUS AND METHOD FOR REBROADCASTING SIGNALS IN AN OPTICAL BACKPLANE BUS SYSTEM

RELATED APPLICATIONS

This application claims the benefit of U.S. Provisional Patent Application Serial No. 60/219,986 filed by Gicherl Kim on Jul. 21, 2000 and entitled "Method for Rebroadcasting Signals in an Optical Backplane Bus System."

GOVERNMENTAL RIGHTS

The invention was made with Government support under Contract No. DASG60-98-M-0060 awarded by U.S. Army Space and Missile Defense Command, Contr & Acq. Mgmt Ofc., SMDC-CM-CK. The Government has certain rights in the invention.

TECHNICAL FIELD OF THE INVENTION

The present invention is related to optical communication systems and, more particularly, to optical backplanes associated with communicating information between components of a computer system and communicating multiple optical signals in telecommunication networks.

BACKGROUND OF THE INVENTION

The current generation of computers is often limited by the speed at which information can be transmitted between electronic components such as processors and memory chips. For example, a typical personal computer bus or motherboard operates at a frequency of only 100 MHz, whereas processors are often able to reach speeds of 1 GHz. Similarly, logic circuits frequently outpace inter-board interconnect speeds within subsystems which depend on communications between cards within a computer. Development of technologies for communications within computer systems to replace conventional passive backplanes and motherboards is a long standing goal to achieve higher data throughputs. Under current conditions, bus traffic generally increases as computing power of a processor increases. Therefore, limited bus bandwidth associated with many computer systems represents a major bottleneck to efficient communications between board-to-board data interfaces.

There are two major types of optical backplanes: free space and guided wave. Free space optical backplane bus system generally has free space channels and diffractive optical elements to direct associated signal beams. Guided wave optical backplanes generally include optical beams traveling through total internal reflection within an associated waveguiding plate. DOEs such as holographic gratings are frequently used as beamsplitter/deflectors in guided wave optical backplanes.

Difficulties have been noted in both types of optical backplane with obtaining uniform optical signal power levels at the respective outputs. Uniform intensity of output optical signal power levels is difficult to obtain even when diffraction efficiencies of associated DOE's has been optimized in a prior guided wave optical backplanes.

Optical backplanes typically include one or more optical signal input ports and one or more optical signal output ports. Incoming optical signals are monitored at each input port. The optical signal is generally directly coupled to an optical backplane which routes the signal to another unit or component associated with the optical communication system. One example of such components includes optical cross connect fabric, optical switches, wavelength division multiplexers and/or demultiplexers. Optical backplanes often provide a cost effective and compact solution for many optical communication systems.

SUMMARY OF THE INVENTION

In accordance with teachings of the present invention a method and apparatus are disclosed for broadcasting and rebroadcasting optical signals to multiple components of a computer system. One aspect of the present invention includes an optical backplane assembly for communicating optical signals with multiple components based on guided wave interconnects. The invention may be implemented with holograms and active optical elements providing interfaces between a conventional electrical backplane with attached components such as circuit boards and an optical backplane. One embodiment includes a distributor installed as a center component having a receiver, a doubly multiplexed hologram, and a transmitter. Any signals coming from one of the components may be collected by the receiver of the distributor and rebroadcast from the transmitter of the distributor to all of the other components.

A further aspect of the present invention includes an optical bus assembly with very high data throughput capability as compared with conventional passive busses and backplanes. The optical bus assembly preferably includes bidirectional signal paths to both receive and transmit optical signals between a plurality of components such as circuit boards. Active couplers formed in accordance with teachings of the present invention may both receive and transmit optical signals. Each active coupler may include active optical elements such as an optical signal transmitter and an optical signal receiver. Each active coupler may also include a hologram or holographic optical element which functions as an optical signal beam splitter and an optical signal deflector.

Technical advantages of the present invention include increased bandwidth capacity, increased speed, reduced cross talk and reduced interference during communication of optical signals between various components of a computer system or a communication system. Additional components may be added to an optical backplane assembly formed in accordance with teachings of the present invention without substantially decreasing associated bandwidth capacity or speed of data communication between components and without a significant increase in cross talk or interference during communication of optical signals between the components. The number of slots or electrical connections associated with the optical backplane assembly may be substantially increased without reducing overall performance characteristics of the optical backplane assembly and attached components.

An optical backplane assembly formed in accordance with teachings of the present invention may use existing slots or electrical connections associated with presently available electrical backplanes and existing electrical circuit cards or any other component. Both initial assembly and later modification of the optical backplane assembly may be easily accomplished by directly connecting components with the conventional electrical backplane. Any component coupled with an optical backplane assembly formed in accordance with teachings of the present invention may transmit and receive data or information from all other components coupled with the optical backplane assembly. Also, components may be inserted or removed from the optical backplane assembly without limiting or restricting communication between other components coupled with the optical backplane assembly.

Another aspect of the present invention includes an optical backplane assembly with a distributor operable to switch optical signals in large optical communication or telecommunication networks. The distributor is preferably located adjacent to a midpoint in the optical backplane assembly. The distributor may receive optical signals from other components attached to the optical backplane assembly, switch the optical signals, and rebroadcast the optical signals to the other components.

An optical backplane assembly with a central distributor formed in accordance with teachings of the present invention provides substantial advantages as compared to prior guided wave and free space optical backplane systems used for broadcasting signals. These advantages include equalized fan-out power or output power, increased interconnect distance, and simpler fabrication. The distributor with active optical elements allows doubling associated interconnect distances as compared to many prior optical backplanes. The present invention reduces the total number of diffractive optical elements such as single holograms and doubly multiplexed holograms required to produce an optical backplane assembly. The number of fabrication and assembly steps is also reduced.

BRIEF DESCRIPTION OF THE DRAWINGS

A more complete understanding of the present invention and advantages thereof may be acquired by referring to the following description taken in conjunction with the accompanying drawings, in which the reference numbers may indicate like features, and wherein;

FIG. 2a is a schematic drawing showing respective optical signals transmitted from components coupled with the optical bus assembly of FIG. 1 to an associated distributor;

FIG. 2b is a schematic drawing showing the distributor of FIG. 2a transmitting or rebroadcasting optical signals to all other components coupled with the optical bus assembly of FIG. 1;

FIG. 3 is a schematic drawing showing portions of a prior art optical backplane assembly formed with three doubly multiplex hologram and two single holograms to provide five board interconnects;

FIG. 4 is a schematic drawing showing one example of a prior art optical backplane assembly communicating optical signals in free space between attached components;

FIG. 5a is a schematic drawing showing optical signal power distribution between multiple components coupled with an optical backplane formed in accordance with teachings of the present invention;

FIG. 5b is a schematic drawing which demonstrates that substantially the same amount of optical signal power will be delivered to the distributor of an optical backplane assembly formed in accordance with teachings of the present invention;

FIG. 8a is a schematic drawing showing an exploded isometric view with portions broken away of an optical bus assembly formed in accordance with teachings of the present invention to switch a large number of multiplexed optical signals associated with telecommunication systems and networks; and FIG. 8b is a schematic drawing with portions broken away showing a comparison between the distributor of FIG. 8a and a plurality of conventional optical switches used in telecommunication systems and networks.

DETAILED DESCRIPTION OF THE INVENTION

Figure 1:
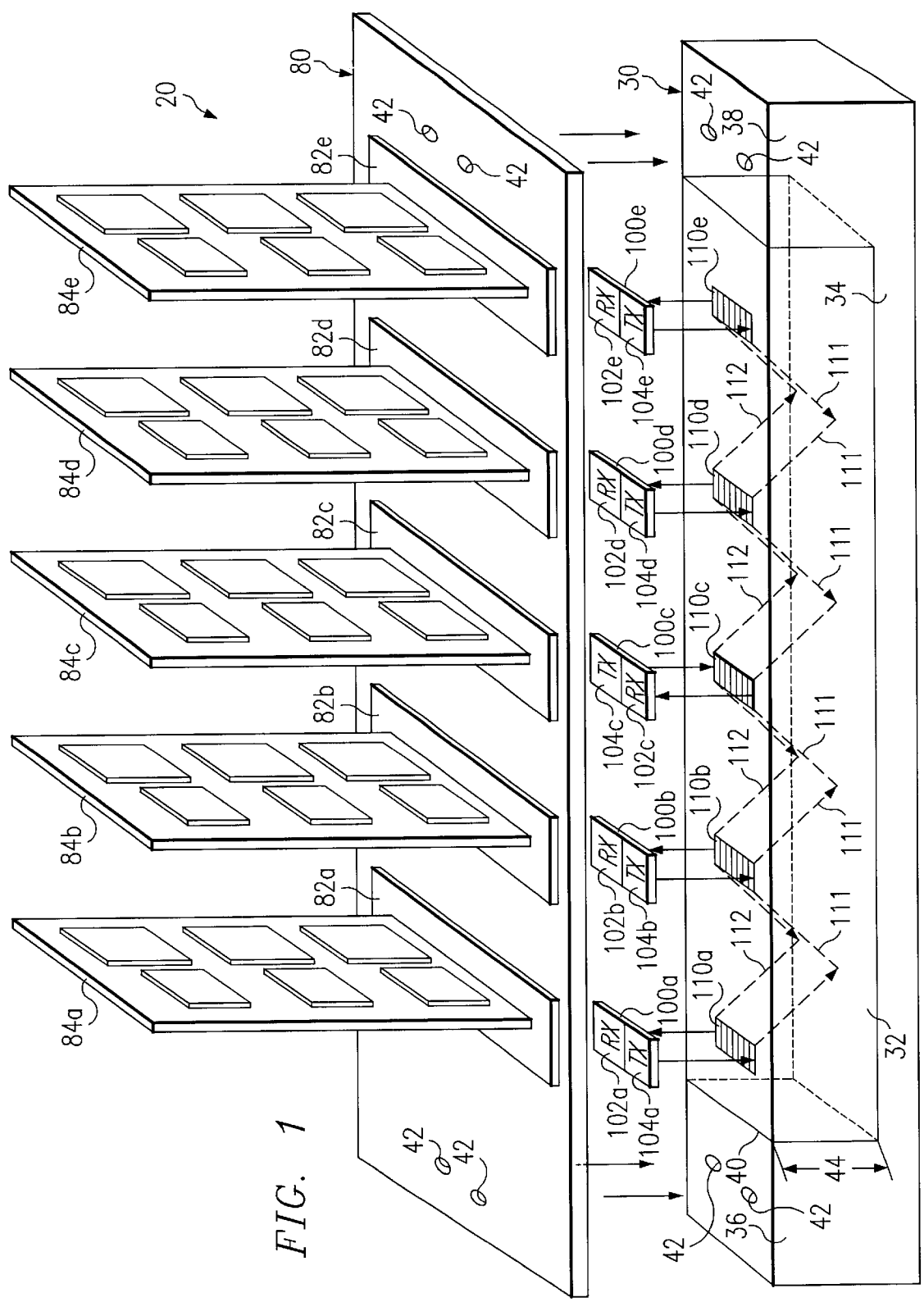
FIG. 1 is a schematic drawing showing an exploded, isometric view with portions broken away of an optical bus assembly formed in accordance with teachings of the present invention.

Preferred embodiments of the present invention and its advantages are best understood by reference to FIGS. 1 through 8b, wherein like reference numbers may be used to indicate like and corresponding parts.

The terms "optical signal or signals" and "lightwave signal or signals" are used in this application to include the full range of all electromagnetic radiation which may be satisfactorily used to communicate information through a waveguide, waveguiding plate and/or fiber optic cables. An optical backplane assembly incorporating teachings of the present invention may be satisfactorily used to communicate optical signals in the infrared, visible and ultraviolet spectrum.

The terms "polymer" and "polymers" are used in this application to include any macromolecule combinations formed by the chemical union of multiple, substantially identical combining units or monomers and have satisfactory characteristics for use as diffractive optical elements such as holograms or for use as a waveguiding plate. Combinations of two, three or four monomers are often referred to respectively as dimmers, trimmers, and tetromers. These combinations may be further classified as inorganic, organic, natural, synthetic or semisynthetic. For purposes of this application, the term "polymers or other combinations of monomers" means any combination of two or more monomers or other combining units which may be satisfactorily used to form a waveguide in accordance with teachings of the present invention including, but not limited to, inorganic, organic, natural, synthetic and semisynthetic combinations.

The terms "active optical element" and "active optical elements" are used in this application to include various types of transmitters and receivers satisfactory for communicating optical signals between multiple components such as electrical circuit boards using an optical backplane formed in accordance with teachings of the present invention. Examples of such active optical elements include, but are not limited to, lasers, light emitting diodes (LEDs), PIN photodiodes and other photodetectors. PIN refers to p-type intrinsic n-type junction. For some applications vertical cavity surface emitting lasers (VCSELs) may be used as active optical elements in accordance with teachings of the present invention.

The term "backplane" often means a circuit board containing sockets or slots into which other circuit boards or components may be plugged. For personal computers, the terms "backplane" and "motherboard" generally mean a large circuit board that contains multiple slots for expansion cards. Backplanes may be described as either active or passive. Active backplanes, in addition to slots, contain logic circuits that perform computing functions. Passive backplanes typically contain no logic circuits. The terms motherboard and backplane are often used synonymously when describing components of a computer system.

The term "bus" for computer systems often means a collection of wires which transmit data from one portion of the computer system to another portion. For example, many personal computers include an internal bus that connects all internal components with the associated central processing unit (CPU) and the associated main memory. All or portions of a computer system bus may be mounted on an associated backplane or motherboard. An optical backplane assembly formed in accordance with teachings of the present invention may include a waveguiding plate or other types of waveguides which function as an optical signal bus to transmit data and information in the form of optical signals between multiple components coupled with the optical backplane assembly.

The term "latency" is often used to describe the time that one component in a system is waiting for information or data from another component in the system. Latency is generally waiting time. In a network or bus, latency is the amount of time required for a packet of information or data to travel from a source to a destination. Latency and bandwidth define the speed and capacity of a network or bus.

Portions of optical backplane assembly 20 incorporating teachings of the present invention are shown in FIG. 1. Optical backplane assembly 20 may also sometimes be referred to as "an optical bus assembly." For the embodiment of the present invention as shown in FIG. 1, optical backplane assembly 20 includes optical backplane 30 and electrical backplane 80. Optical backplane 30 may sometimes be referred to as optical bus 30. Multiple slots 82 are preferably provided on electrical backplane 80 for operably coupling various components 84 thereto. Components 84 may be part of a computer system (not expressly shown) and/or part of a communication network (not expressly shown).

One of the main functions of optical backplane assembly 20 includes providing bidirectional signal paths for communicating or broadcasting and rebroadcasting optical signals between components 84 attached thereto. The present invention allows each component 84 to both send and receive optical signals from all of the other components 84 attached to optical backplane assembly 20.

For the embodiment of the present invention as shown in FIG. 1, electrical backplane 80 includes five (5) slots 82. Each component 84 may be respectively coupled with electrical backplane 80 using slots 82. Various types of electrical connections and sockets may be satisfactorily used as slots 82. Each slot 82 may be operable to receive various components such as electrical circuit boards and a distributor. For purposes of describing various features of the present invention, slots 82 have been designated 82a, 82b, 82c, 82d and 82e. Respective components 84 coupled with slots 82 have been designated 84a, 84b, 84 c, 84d and 84e. Although only five slots 82 and five associated components 84 are shown in FIG. 1, important technical advantages of the present invention include the ability to add additional slots and components to an optical backplane assembly without substantially decreasing or limiting the power level of optical signals communicated there between and without reducing or limiting operational characteristics of the associated optical backplane assembly.

Optical backplane 30 preferably includes waveguiding plate 32 and supporting structure 34. As discussed later in more detail, waveguiding plate 32 may be formed from various types of materials including, but not limited to, polymers satisfactory for use in communicating optical signals therethrough. Various types of supporting structures may also be used to form an optical backplane in accordance with teachings of the present invention. The present invention is not limited to supporting structure 34.

Waveguiding plate 32 may have a generally elongated configuration with a generally square or rectangular cross section such as shown in FIG. 1. The dimensions, particularly thickness 44, of waveguiding plate 32 are greater than a typical waveguide used to communicate optical signals. The length of waveguiding plate 32, spacing between diffractive optical elements 110 disposed thereon and thickness 44 are selected such that optical signals may be communicated from one component 84 through waveguiding plate 32 to an immediately adjacent component 84 using total internal reflection (TIR).

Supporting structure 34 includes respective ends 36 and 38 which cooperate with each other to partially define opening 40 disposed therebetween. The configuration and dimensions of opening 40 are preferably selected to be compatible with the desired configuration and dimensions of waveguiding plate 32. For the embodiment of the present invention as shown in FIG. 1 electrical backplane 80 and ends 36 and 38 of supporting structure 34 contain respective holes or openings 42 which may be aligned with each other during fabrication of optical backplane assembly 20. Various types of mechanical fasteners (not expressly shown) may be used with holes 42 to maintain desired alignment between respective active couplers 100 and diffractive optical elements 110. An optical backplane assembly may be formed in accordance with teachings of the present invention with a waveguiding plate and a supporting structure having various configurations other than the configurations shown in FIG. 1.

Respective active couplers 100 are preferably disposed between each slot 82 and optical waveguiding plate 32. Active couplers 100 and associated diffractive optical elements 110 function as interfaces between electrical signals associated with components 84 and optical signals transmitted or communicated through waveguiding plate 32. For the embodiment of the present invention as shown in FIGS. 1 through 2b, each active coupler 100 may include two active optical elements such as optical receiver 102 and optical transmitter 104. For some applications each optical receiver 102 may include a preamplifier, a detector and a postamplifier. Each optical transmitter 104 may include a VCSEL and associated driver.

Each active coupler 100 may also include an associated diffractive optical element 110. For embodiments such as shown in FIGS. 1–2b and 5a–8b, diffractive optical elements 110 may be holograms or holographic optical elements formed from various types of polymers. For some applications, diffractive optical elements 110 may be described as relatively thick, multiplexed holograms or holographic optical elements with functions and operating characteristics similar to conventional Bragg gratings. The holograms may also be described as "phase holograms" which do not absorb optical signal power. Diffractive optical elements 110 may also be described as "volume holograms" which deflect optical signals at a selected angle as the optical signals pass through the hologram. The term "hologram" as used in this application may also include a holographic optical element (HOE).

For purposes of describing various features of the present invention, respective active couplers 100, optical receivers 102, optical transmitters 104 and holograms or diffractive optical elements 110 have been designated as a, b, c, d and e. As previously noted, any number of components 84 may be coupled with an optical bus assembly formed in accordance with teachings of the present invention. Therefore, the present invention is not limited to use with only five active couplers 100 as shown in FIG. 1.

Active couplers 100 are preferably attached to and operably connected with respective slots 82 and disposed immediately adjacent to waveguiding plate 32. This configuration allows insertion and/or removal of components 84 from their respective slots 82 without affecting the ability of active couplers 100 to communicate or broadcast optical signals through waveguiding plate 32. Also, inservion and/or removal of one component 84 does not affect alignment of the respective active coupler 100 and diffractive optical element 110 relative to waveguiding plate 32 and other active couplers 100.

For some applications slots 82a, 82b, 82d and 82e and associated active couplers 100a, 100b, 100d and 100e may be symmetrically arranged with respect to component 84c and its associated slot 82c and active coupler 100c. Components 84, slots 82 and respective active couplers 100 may also be symmetrically arranged with respect to each other along an optical axis (not expressly shown) associated with optical waveguiding plate 32. The operational characteristics associated with active couplers 100 may be approximately the same.

For the embodiment of the present invention as shown in FIG. 1, optical transmitters 104a and 104b, optical receiver 102c and optical transmitters 104d and 104e are generally aligned with each other along a first optical signal channel provided by waveguiding plate 32. The first optical signal channel is represented by arrows 111. Optical receivers 102a and 102b, optical transmitter 104c and optical receivers 102d and 102e are generally aligned with each other along a second optical signal channel provided by waveguiding plate 32. The second optical signal channel is represented by arrows 112.

Respective diffractive optical elements such as holograms 110a, 110b, 110c, 110d and 110e are preferably disposed on waveguiding plate 32 adjacent to respective slots 82 and attached active couplers 100. Optical signals will communicate through a relatively small air gap or free space between each active coupler 100 and its associated hologram 110. As previously noted holograms 110 may be described as "volume holograms" which deflect an optical signal at a selected angle as the optical signal passes therethrough. For the embodiment as shown in FIG. 1, each hologram 110 preferably deflects optical signals at an angle of approximately forty-five degrees 45° relative to the longitudinal axis or the optical axis (not expressly shown) associated with waveguiding plate 32.

Total internal reflection of optical signals will occur within waveguiding plate 32 when optical signals propagate within waveguiding plate 32 at an angle greater than a critical angle associated with the dimensions and the type of material used to form waveguiding plate 32. For the embodiment of the present invention as shown in FIG. 1, thickness dimension 44 of waveguiding plate 32, the longitudinal spacing between adjacent holograms 110 and associated active couplers 100 is selected so that optical signals communicated between components 84 will experience total internal refraction.

For some applications slot 82c and its associated active coupler 100c are preferably located proximate a midpoint of waveguiding plate 32. Component 84c may function as a "distributor" to receive respective optical signals transmitted from components 84a, 84b, 84d and 84e and to rebroadcast such optical signals to the other components 84a, 84b, 84d and 84e. For some applications, distributor 84c may modify one or more of the received optical signals depending upon the type of electrical circuits and software associated with distributor 84c. Distributor 84c may also generate optical signals which are transmitted or communicated to other components 84a, 84b, 84d and 84e. A central distributor such as distributor 84c may perform functions similar to a regenerator in a fiber optic communication system. The distributor may be used to amplify weak optical signals, reshape optical signals, and rebroadcast clean optical signals to all other components coupled with the associated optical backplane assembly.

Optical backplane assembly 20 may be described as a centralized system for communicating optical signals when distributor 84c is located approximately over the center of waveguiding plate 32 between components 84a and 84b and components 84d and 84e. One of the functions of component 84c or distributor 84c is to collect data or information transmitted from one or more components 84 and to rebroadcast such data or information to all other components 84.

Active couplers 100 in cooperation with diffractive optical elements 110 and waveguiding plate 32 function as board-to-board or component-to-component interconnectors. Distributor 84c may be compared with an active 2×3 optical coupler, with two inputs from associated components 84, one output to distributor 84c, and two outputs to other components 84 disposed on opposite sides of distributor 84c. Interconnect distance is often a major performance parameter for many optical bus assemblies associated with computer systems and telecommunication systems. Due to optical cross talk in many optical systems, only a limited number of components may be attached to each bus. Interconnect distances associated with optical bus assembly 20 can be doubled by use of central distributor 84c.

Hologram 110c associated with active coupler 100c may be described as a doubly multiplexed hologram (DH) which functions as a beam splitter and a deflector. Holograms 110a, 110b, 110d and 110e associated with respective active couplers 100a, 100b, 100d and 100e may be described as single holograms (SH). Holograms 110a and 110b are preferably formed to deflect or direct optical signals transmitted from respective active couplers 100a and 100b toward active coupler 100c. In a similar manner, holograms 110d and 110e are preferably formed to deflect or direct optical signals from respective active couplers 100d and 100e toward active coupler 100c.

As discussed later in more detail doubly multiplexed hologram 110c may direct optical signals transmitted from active coupler 100c through waveguiding plate 32 in a first direction toward holograms 110a, 110b and their associated active couplers 100a and 100b and in a second direction toward holograms 110d and 110e and their associated active couplers 100d and 100e. As a result of the cooperation between active coupler 100c and doubly multiplexed hologram 110c, optical backplane assembly 20 may be described as providing bidirectional signal paths from distributor 84c to other components 84 disposed on opposite sides thereof.

FIG. 2a is a schematic drawing showing optical signal 124a being transmitted from component 84a to distributor 84c, optical signal 124b transmitted from component 84b to distributor 84c and optical signal 124e transmitted from component 84e to distributor 84c. For this example, component 84d is not transmitting an optical signal. For this example, components 84a, 84b and 84e may generate respective electrical signals which are converted by optical transmitters 104a, 104b, and 104e into respective optical signals 124a, 124b and 124e. Holograms 110a, 110b and 110e are used to direct or couple the respective optical signals 124a, 124b and 124e at an angle of approximately forty-five degrees (45°) into optical waveguiding plate 32. Forty-five degrees (45°) is greater than the critical angle required for total internal refraction of optical signals in waveguiding plate 32. For the embodiments shown in FIGS. 1, 2a and 2b optical signals generally enter and exit holograms 110 at an angle normal to the adjacent surface of waveguiding plate 32.

Hologram 110b helps to direct optical signal 124a to hologram 110c and also couples optical signal 124b with optical waveguide 32 into waveguiding plate 32. In a similar manner hologram 110d helps to direct optical signal 124e from hologram 110e to hologram 110c. Optical signals 124a, 124b and 124e may be communicated through the first optical signal channel provided by optical waveguiding plate 32. See arrows 111 of FIG. 1.

FIG. 2b is a schematic drawing which shows distributor 84c transmitting optical signal 120 generated by distributor 84c or rebroadcasting an optical signal from one of the other components 84a, 84b, 84d and 84e, to receivers 102a, 102b, 102d and 102e of respective active couplers 100a, 100b, 100d, 100e. Hologram 110c preferably divides or splits optical signal 120 from optical transmitter 102c into two optical signals 120a and 120b which have approximately the same optical signal level or power (a 50%/50% optical power split). Optical signals 120a and 120b may be communicated in both directions from distributor 84c through the second optical signal channel provided by optical waveguiding plate 32. See arrows 112 of FIG. 1.

The location of active couplers 100a, 100b, 100c, 100d, 100e and associated slots 82a, 82b, 82c, 82d and 82e are selected such that total internal reflection associated with optical waveguiding plate 32 will direct optical signal 120a to holograms 110b and 110a. In a similar manner optical signal 120b is directed to holograms 110d and 110e.

Each hologram 110b and 110d is preferably operable to direct at least a portion of respective optical signals 120a and 120b to the respective optical receivers 102a and 102e while also directing at least a portion of respective optical signals 120a and 120b to respective optical receivers 102b and 102d. The optical signal level or amount of optical power directed from waveguiding plate 32 to optical receiver 102b and 102d and the amount of optical power or optical signal level transmitted to adjacent holographic optical elements 110a and 110e depends upon the diffraction efficiency of holograms 110b and 110d.

The latency associated with an optical backplane assembly or an optical bus is generally determined by the longest signal path between a component originating an optical signal and a component which receives the optical signal. By placing distributor 84c and its associated active coupler 100c proximate the midpoint of waveguiding plate 32, the longest signal path length for an optical signal originating with component 84c is approximately one-half (½) the signal path length for an optical signal traveling from one end of optical waveguiding plate 32 to the opposite end of optical waveguiding plate 32. One of the benefits associated with placing distributor 84c proximate the midpoint of optical waveguiding plate 32 is reducing latency associated with optical signals communicated from distributor 84c through waveguiding plate 32 by approximately one-half. Optical backplane assembly 20 also provides bidirectional signal paths for communication of optical signals between distributor 84c and other components 84 attached on opposite sides thereto.

Various types of light signal transmitters such as light emitting diodes (LEDs) (not expressly shown) and laser sources (not expressly shown) and signal conditioning electronics (not expressly shown) may be used as optical transmitters 104 to provide optical signals to an optical backplane system formed in accordance with teachings of the present invention. For some applications a vertical cavity surface emitting laser (VCSEL) and an associated line driver (not expressly shown) may be used to form optical transmitters 104. VCSEL is a type of laser which emits optical signals or light beams vertically from an associated chip and not from an edge of the associated chip. Other types of lasers may be satisfactorily used to form optical transmitters 104.

For some applications electronic circuitry associated with optical receivers 102 and optical transmitters 104 will preferably be formed on electrical backplane 80 or included within respective slots 102. For other applications components 84 coupled with electrical backplane 80 may include portions of the electronic circuitry associated with respective optical receivers 102 and optical transmitters 104. However, depending upon characteristics of optical receivers 102 and optical transmitters 104, including portions of the associated electronic circuitry as part of the respective components 84 may limit the ability to interchange components or use conventional components which do not include such electronic circuitry.

As previously noted holograms 110a, 110b, 110d and 110e are preferably "single holograms". When an optical signal travelling through optical waveguiding plate 32 contacts holograms 110a, 110b, 110d and 110e, a portion of the optical is coupled out or directed to the associated optical receiver 102a, 102b, 102d and 102e. The remaining portion of the optical signal continues along its propagation path within waveguiding plate 32 to the next adjacent hologram 110. The amount of optical power coupled out or directed to the respective receiver 102 and the amount of optical power which remains within waveguiding plate 32 depends upon diffraction efficiencies of respective holograms 110a, 110b, 110d and 110e. By controlling the diffraction efficiencies of holograms 110, an efficient power budget may be maintained for an optical backplane assembly formed in accordance with teachings of the present invention.

The optical power budget of a multiplexed optical signal system is generally limited by an associated output channel with the minimum amount of available optical power. Output signal power levels (sometimes referred to as fan-out power) may be equalized in a centralized optical backplane assembly formed in accordance with teachings of the present invention by controlling diffraction efficiencies associated with the respective single holograms. The symmetric configuration of associated components 84 and their respective active couplers 100 with respect to distributor 84c results in this significant technical advantage.

FIG. 3 is a schematic drawing showing portions of a prior art optical backplane assembly. For this example, optical backplane assembly 50 includes waveguiding plate 52. Optical transmitters 54 are optically coupled with one side of waveguiding plate 52. Optical receivers 56 are optically coupled with the opposite side of waveguiding plate 52. For this example optical backplane assembly 50 includes two single holograms 58a and 58e and three doubly multiplexed holograms 58b, 58c and 58d. Optical backplane assembly 50 has five board interconnects. Arrows 60 represent optical signals broadcast through waveguiding plate 52 using doubly multiplexed holograms 58b, 58c and 58d. The bidirectional signals associated with doubly multiplexed holograms 58b, 58c and 58d results in nonuniform output signal levels or output power even when the diffraction efficiencies of the associated holograms are optimized.

FIG. 4 is a schematic drawing showing one example of an optical backplane assembly which communicates optical signals in free space between attached components. Optical backplane assembly 220 as shown in FIG. 4 includes six optical components 284. Each component 284 also includes a respective optical receiver 202 and optical transmitter 204. Optical components 284, optical receivers 202 and optical transmitters 204 are designated respectively as a, b, c, d, e and f. Respective waveguiding plates 232 are also provided with each component 284. Diffractive optical elements 210, 212, 214 and 216 such as holograms are preferably formed on waveguiding plates 232.

A free space optical backplane assembly such as optical backplane assembly 220 includes a substantially large number of holograms 210 through 216 as compared with the number of holograms associated with optical backplane assembly 20 formed in accordance with teachings of the present invention. Maximum broadcasting efficiency of optical backplane assembly 220 may be 25% with 75% power loss, and receiving power variation is 2.8% to 11.3% for components 284a, 284b, 284e and 284f. Thus, each output optical signal associated with optical backplane assembly 220 generally requires different receiver gain and sensitivity to detect respective optical signals. This complexity limits the performance of many multi-board interconnect systems such as optical backplane assembly 220, and complicates the corresponding fabrication procedures.

FIG. 5a is a schematic representation of optical backplane assembly 320 formed in accordance with teachings of the present invention. Optical backplane assembly 320 preferably includes a distributor (not expressly shown) and other components (not expressly shown) coupled with waveguiding plate 332. FIG. 5a demonstrates that when (2n+1) components are attached to optical backplane assembly 320, respective optical signal levels or output power levels received by other components from the distributor are substantially equal. An optical backplane assembly formed in accordance with teaching of the present invention distribute approximately equally or fans-out approximately equally optical power output from the distributor to all other attached components.

The distributor and its associated active optical elements may be disposed adjacent to doubly multiplexed hologram 310d. The other components and their respective active optical elements will preferably be disposed adjacent to single holograms $310_{\eta-n}$ through $310_{\eta+n}$. Cooperation between doubly multiplexed hologram 310d and associated single holograms $310_{\eta-n}$ and $310_{\eta+n}$ and their associated active optical elements shows that the power fan-out or optical power output supplied to each of the associated components from the distributor is approximately equal for all of the other components.

Optical power output is distributed by doubly multiplexed hologram 310d approximately equally in both directions from the middle of waveguiding plate 332 to the opposite ends thereof. Hologram 310d for the distributor directs 50% of the optical output power from the distributor toward both the left and the right portion of waveguiding plate 332. In addition, the symmetric configuration of holograms 310 satisfies $$\eta_i = \eta_{-i} \quad (1)$$

Further, since all remaining power at the $+n^{th}$ board and $-n^{th}$ board is coupled out through respective single holograms, the final holograms $310_{\eta-n}$ and $310_{\eta+n}$ of waveguiding plate 332 should have 100% diffraction efficiency. With this conceptual basis, the optical power output to the $i^{th}$ component is expressed as $$0.5 \cdot (1-\eta_1)(1-\eta_2) \ldots (1-\eta_{i-1})\eta_i \quad (2)$$

and the optical power output in $(i+1)^{th}$ as $$0.5 \cdot (1-\eta_1)(1-\eta_2) \ldots (1-\eta_{i-1})(1-\eta_i)\eta_{i+1} \quad (3)$$

In order to equalize optical power output to the receiver, two power equations (2) and (3) must be equal. Therefore, the condition for equalized fan-outs is simplified by $$\eta_{i+1} = \frac{\eta_i}{1-\eta_i}, \text{ or equivalently, } \eta_i = \frac{\eta_{i+1}}{1+\eta_{i+1}} \quad (4)$$

For example, the diffraction efficiencies of five holograms in a five-board interconnect system such as optical backplane assembly 20 may be calculated starting from 100% for $\eta_{-2}$ and $\eta_{+2}$, then 50% of efficiency for $\eta_{-1}$ and $\eta_{+1}$ from Eq. (4), finally the 50%/50% for a center doubly multiplexed hologram. In this example, all output power has the same value; 25% of input power ($0.5 \times 0.5 \times P_{in}$)

$$P_{out} = 0.5 \times 0.5 \times P_{in}$$

For an optical backplane assembly formed in accordance with teachings of the present invention, the delivered power from an optical signal transmitter of any component to the receiver in the distributor will generally be automatically equalized with the condition of the same hologram configurations in the equalized power fan-out scheme. Consider the optical signals from $i^{th}$ and $(i+1)^{th}$ component coupled with the optical backplane assembly. FIG. 5b shows the associated holograms $\eta_i$ and $\eta_{i+1}$. To deliver the same amount of power to an associated distributor, $\eta_i P_i$ should be equal to $\eta_{i+1}(1-\eta_i)P_{i+1}$. The ratio of $(1-\eta_i)$ comes from the diffraction loss after total internal reflection between $i^{th}$ hologram film and air interface. Therefore, the same power will be delivered to distributor if $P_i = P_{i+1}$ (input power should be same). There may be power loss due to diffractions from other holograms after total internal reflection between the respective hologram and air interface and the undiffracted beam when an optical signal from a transmitter in a component is coupled into the associated optical waveguide through a single hologram. The condition for equal power to the distributor is generally identical to the one for equalized fan-out power. Therefore, the condition for delivering equalized optical power from a component to the associated distributor is automatically satisfied with the same configuration of hologram efficiencies.

Overall optical link efficiency for each optical signal path is determined by efficiencies of the diffractive optical elements or holograms in the link. Optical backplane assemblies formed in accordance with teachings of the present invention are generally configured symmetrically. Therefore, power budget calculation is relatively simple. Power delivered to an optical receiver at the associated distributor is generally the same no matter where the optical signal originated. Loss of power generally happens only when an optical signal is delivered to the distributor. Power loss is simply the diffraction efficiency of a single hologram near the distributor times 0.5 (based on the efficiency of the doubly multiplexed hologram). The power received by each component is generally the same and no power loss is anticipated when an optical signal is broadcast from the distributor to the other components.

Figure 6:
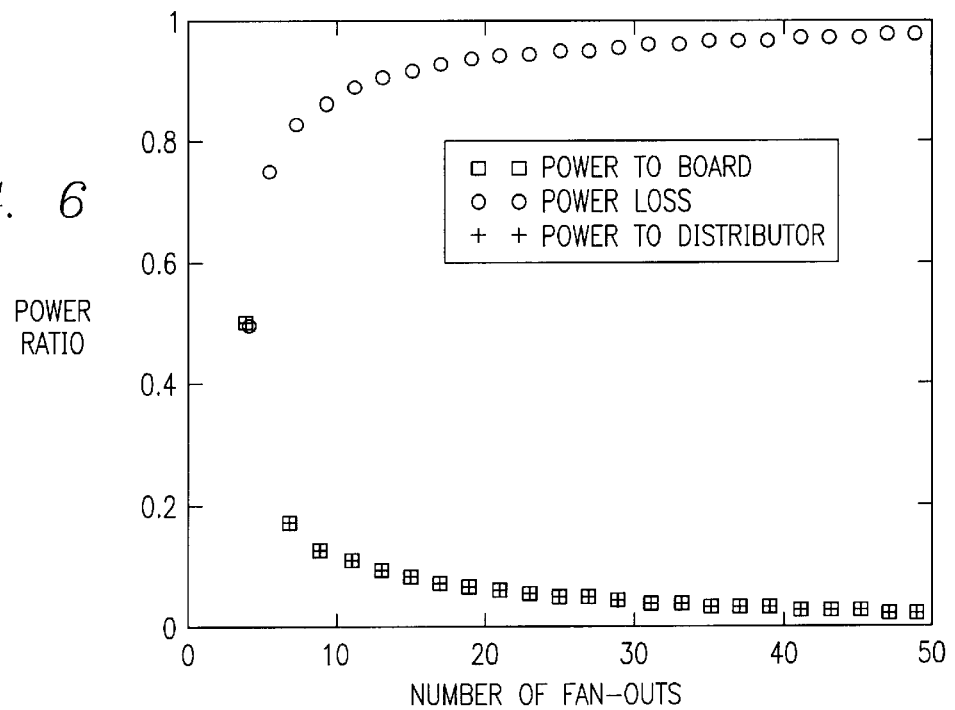
FIG. 6 is a graphical representation of optical power distribution associated with multiple components coupled to an optical backplane formed in accordance with teachings of the present invention.

FIG. 6 shows the result of power budget estimation for a centralized optical backplane assembly formed in accordance with teachings of the present invention. The power delivered to the distributor and fan-out power are decreased as the number of attached components increases, because each component shares an equal amount of the power from a transmitter in the distributor. Thus, because of the generally symmetric configuration of the active couplers and associated holograms in a centralized optical backplane assembly, the received power at each component is generally equal to the delivered power to the distributor with a given number of components.

A centralized optical backplane assembly formed in accordance with teachings of the present invention for n-component interconnects may have (n−1) single holograms and one doubly multiplexed hologram. Fabrication of a doubly multiplexed hologram generally takes twice the time of a single hologram and requires significant effort to reach exact diffraction efficiency. By contrast, previously-reported guided wave optical backplanes have often required (n−2) doubly multiplexed holograms and two single holograms. For example, a prior seven-board interconnect system requires fabrication of five doubly multiplexed holograms and two single holograms. The present invention may provide the same functions using only one doubly multiplexed hologram and six single holograms for a centralized optical backplane system. A free space optical backplane is often even more demanding. Ten single holograms and one doubly multiplexed hologram would be needed to implement even a four component broadcasting system.

Another advantage of the present invention includes ease of system assembly. All component interconnects require only one optical transmitter and one optical receiver per component. The optical transmitters and optical receivers may be positioned at the bottom on electrical backplane and directly connected to the optical backplane such as shown in FIG. 1. In many previous guided wave devices the transmitters are disposed above the respective holograms and the receivers disposed below the waveguiding plate, placing the waveguiding plate between the associated transmitters and receivers. Such prior art devices often resulted in the need for additional holders for the transmitters and receivers and extra electrical lines for the lower optical receivers to provide a connection to the backplane board. Even when every module in the backplane board is well-positioned, the assembly of the active optical elements in free space introduces greater complexity than the present invention, primarily because of complexity of optical signal routing scheme.

Figure 7A:
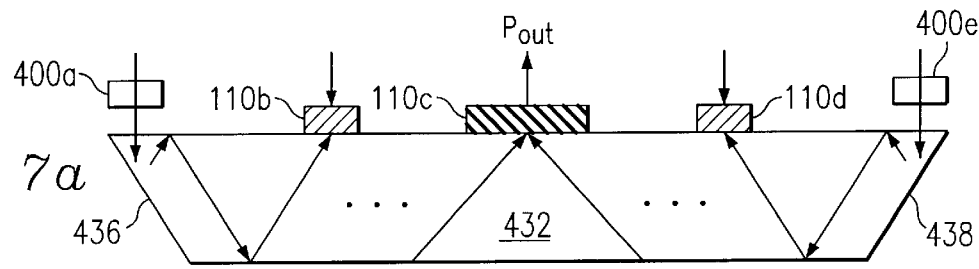
FIG. 7a is a schematic drawing showing another embodiment of an optical backplane formed in accordance with teachings of the present invention.
Figure 7B:
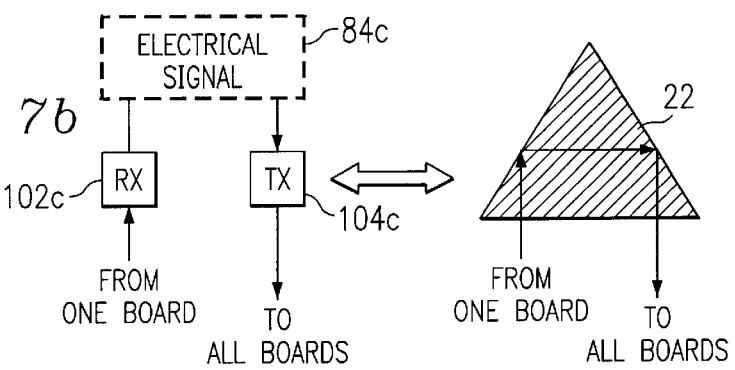
FIG. 7b is a schematic drawing showing an alternative embodiment of an optical signal coupler satisfactory for use with an optical backplane assembly formed in accordance with teachings of the present invention.

FIGS. 7a and 7b show examples of alternative embodiments of an optical backplane assembly formed in accordance with teachings of the present invention. Holograms 110a and 110e such as shown in FIG. 1 may be satisfactorily replaced by forming a waveguiding plate with respective beveled angles disposed at opposite ends 436 and 438. For example, waveguiding plate 432 as shown in FIG. 7a includes respective beveled angles of approximately twenty-two and one-half (22.5°) degrees formed at ends 436 and 438. This angle is selected to provide approximately 100% optical signal coupling between waveguiding plate 432 and respective active couplers 400a and 400e disposed adjacent to each end thereof. Forming beveled angles on the end of a waveguiding plate may be convenient because 100% diffraction efficiency of a single hologram is often difficult to achieve.

Another modification includes using a right angle prism with the distributor instead of an optical receiver and an optical transmitter. As shown in FIG. 7b, prism 22 may function similar to a combined optical receiver and optical transmitter in regard to routing optical signals. However, right angle prism 22 is not an active optical device. Therefore, prism 22 cannot generate or regenerate optical signals the same as distributor 84c with an active coupler. The interconnect distance associated with using a right angle prism will generally decrease as compared to a central distributor with an active coupler. Therefore, a right angle prism should generally not be used when longer interconnect distances are desired even though it is an effective low-cost option for some applications.

An optical bus assembly formed in accordance with teachings of the present invention may be used in multi-bus line transfers to provide substantially increased optical signal throughput. Because 1.25 Gb/s VCSELs and PIN photodetectors are commercially available, assembly of active optical elements and electrical circuitry in an electrical backplane is relatively easy during fabrication of the optical bus assembly.

A wide variety of materials and fabrication techniques may be satisfactorily used to form optical waveguiding plate 32 on supporting structure 34. For some applications optical waveguiding plate 32 may be formed on mechanical supporting structure 34 using semiconductor fabrication techniques. For example, portions of supporting structure 34 may be part of a typical silicon wafer (not expressly shown) used in semiconductor fabrication. Waveguide 32 may be formed from a wide variety of materials including polymers, polimide, amorphous fluoropolymers such as Teflon® AF, a mixture of silicon dioxide and polymeric materials, ion exchange in polymer and fluorinated polyamide. Teflon® is a registered trademark of E.I. DuPont de Nemours and Company, Inc. Various types of Teflon® AF are available from DuPont and other companies. Various types of Ultradel polyamide may also be used to form optical waveguiding plate 32. Ultradel is a trade name associated with polimide materials available from BP Amoco.

For some applications optical waveguiding plate 32 may have a thickness (dimension 44) between approximately one millimeter and five millimeters. The length of waveguiding plate 32 may vary between approximately thirty (30) and forty-five (45) centimeters for some applications. Waveguiding plates with different dimensions may also be satisfactorily used with the present invention. One or more layers of cladding (not expressly shown) may be disposed between optical waveguiding plate 32 and supporting structure 34. A wide variety of polymers and other combinations of monomers may be satisfactorily used to form optical waveguiding plate 32 in accordance with teachings of the present invention. The previous discussion of some examples of such chemical compounds is illustrative only and is not intended to limit the scope of the present invention.

FIGS. 8a and 8b are schematic drawings showing one example of an optical bus assembly formed in accordance with teachings of the present invention which may be used with telecommunication systems and networks for switching a large number of multiplexed optical signals. Optical bus 420 preferably includes optical backplane 430 and associated waveguiding plate 432. An electrical backplane (not expressly shown) may also be included as part of optical backplane assembly 420. Five components 484a, 484b, 484c, 484d and 484e are shown in FIG. 8a. However, any number of components 484 may also be coupled with or operably attached to optical bus assembly 420 in accordance with teachings of the present invention. Central component 484c or distributor 484c preferably includes an array of optical receivers 402 and an array of optical transmitters 404. The number of optical receivers 402 and the number of optical transmitters 404 may be selected to correspond with the number and type of multiplexed optical signals which will be switched using optical bus assembly 420.

Distributor 484c preferably includes electrical circuits associated with a conventional electrical switch 406. Optical receivers 402 will convert respective multiplexed optical signals to corresponding electrical signals which may then be switched as desired by electrical switch 406. The electrical signals after the desired switching functions have been completed may then be directed to respective optical transmitters 404 and communicated to other components 484 through waveguiding plate 432 in accordance with teachings of the present invention. Each component 484a, 484b, 484d, 484e and any other components 484 which may be operably attached to optical bus assembly 420 preferably include a respective wavelength division demultiplexer 408 and a respective wavelength division multiplexer 409. Demultiplexers 408 and multiplexers 409 have been designated as a, b, d and e for purposes of describing various features of the present invention.

Doubly multiplexed hologram 410c may be used to couple or direct optical signals from waveguiding plate 432 to optical receivers 402. In a similar manner, doubly multiplexed hologram 410c may be satisfactorily used to couple or direct optical signals from optical transmitters 404 to waveguiding plate 432 in accordance with teachings of the present invention. Single holograms 410a, 410b, 410d and 410e may be used to communicate respective multiplexed optical signals between respective components 484a, 484b, 484d and 484e in accordance with teachings of the present invention.

FIG. 8b is a schematic drawing which shows distributor 484c formed in accordance with teachings of the present invention and conventional optical switches 28a and 28b which may be satisfactorily used to perform similar optical signal switching functions in telecommunication systems and networks. As demonstrated by FIG. 8b, the present invention allows substantially reducing the number of optical switches and/or electrical switches required to satisfactorily switch a large number of multiplexed optical signals in telecommunication systems and networks.

Although the present invention has been described in detail, it should be understood that various changes, substitutions and alternatives may be made to the invention without departing from the spirit and scope thereof.

What is claimed is:

1. An optical backplane assembly for communicating signals between a plurality of components comprising:

a waveguiding plate attached to and mounted on a supporting structure;

the components spaced from each other and coupled with the waveguiding plate;

respective active optical elements operably coupled with each component to receive optical signals from the waveguiding plate and to convert the optical signals to electrical signals;

the active optical elements further operable to convert electrical signals from the respective components into optical signals and to transmit the optical signals to the waveguiding plate;

respective diffractive optical elements disposed between the active optical elements of each component and the waveguiding plate;

one of the components further comprising a distributor with its respective active optical elements disposed proximate a midpoint of the waveguiding plate; and the diffractive optical element for the distributor comprising a doubly multiplexed hologram to allow communicating optical signals through the waveguiding plate with other components disposed on opposite sides of the distributor.

2. The optical backplane assembly of claim 1 wherein the active optical elements further comprise an optical signal transmitter and an optical signal receiver for each component.

3. The optical backplane assembly of claim 1 wherein the diffractive optical elements further comprise holograms.

4. The optical backplane assembly of claim 1 further comprising:

an electrical backplane coupled with an optical backplane;

a plurality of slots formed on the electrical backplane to respectively receive one of the components; and the active optical elements for each component coupled with the respective slot.

5. The optical backplane assembly of claim 1 further comprising at least one of the components selected from the group consisting of an electrical circuit board, a board associated with a computer system and an electrical circuit board associated with a communication network.

6. The optical backplane assembly of claim 1 further comprising the components and their respective active optical elements symmetrically spaced from each other and the distributor.

7. An optical backplane assembly for communicating signals between a plurality of components comprising:

an optical backplane having an optical waveguiding plate attached to and mounted on a supporting structure;

an electrical backplane having a plurality of slots formed thereon;

the electrical backplane coupled with optical backplane;

each of the components respectively disposed in and operably engaged with one of the slots;

respective active optical elements coupled with each slot and disposed between the electrical backplane and the optical waveguiding plate;

a respective hologram disposed on the optical waveguiding plate adjacent to each the active optical elements; and one of the components comprising a distributor disposed over a midpoint of the optical waveguiding plate.

8. The optical backplane assembly of claim 7 wherein the active optical elements further comprise:

an optical receiver operable to receive optical signals from the optical waveguiding plate and to convert the received optical signals to electrical signals which are directed to the respective component; and an optical transmitter operable to convert electrical signals from the respective component into optical signals and to transmit the optical signals to the waveguiding plate through the respective hologram.

9. The optical backplane assembly of claim 7 wherein the hologram disposed adjacent to the active optical elements for the distributor further comprises a doubly multiplexed hologram operable to split optical signals transmitted from the active optical elements into two optical signals with approximately equal power levels.

10. The optical backplane assembly of claim 9 further comprising the doubly multiplexed hologram operable to direct the split optical signals to propagate through the waveguiding plate in generally opposite directions from the distributor.

11. A method for communicating information between a plurality of components attached to an optical backplane assembly comprising:

transmitting an optical signal from at least one component through a waveguiding plate having a generally elongated configuration, wherein the optical signal generated from the at least one component travels to a distributor disposed adjacent to a midpoint of the optical waveguiding plate before being retransmitted from the distributor to the components coupled with the waveguiding plate spaced from the distributor; and receiving the optical signals from the distributor at the other components.

12. The method of claim 11 further comprising communicating optical signals through the waveguiding plate from at least one component to an adjacent component using total internal reflection of the optical signals.

13. The method of claim 11 further comprising:

communicating an optical signal through the waveguiding plate from at least one component;

receiving the optical signal at the distributor; and communicating the optical signal from the distributor to the other components coupled with the waveguiding plate.

14. The method of claim 13 further comprising reshaping the optical signal received by the distributor prior to communicating the received optical signal to the other components coupled with the waveguiding plate.

15. The method of claim 11 further comprising transmitting multiplexed optical signals from at least one component through the waveguiding plate to the distributor and communicating multiplexed optical signals from the distributor to the components coupled with the waveguiding plate.

16. A method for forming an optical bus assembly comprising:

forming a plurality of slots in an electrical backplane with each slot operable to receive a respective component;

forming respective active couplers on the electrical backplane for each slot;

forming an optical backplane having a waveguiding plate;

attaching a plurality of holograms with the waveguiding plate to communicate optical signals between the active couplers and the waveguiding plate;

attaching the electrical backplane to the optical backplane with the active couplers respectively aligned with the holograms; and installing a distributor in one of the slots disposed over a midpoint of the waveguiding plate.

17. The method of claim 16 further comprising attaching a doubly multiplexed hologram on the waveguiding plate proximate the midpoint.

18. The method of claim 16 further comprising installing components of a computer system in the slots.

19. The method of claim 16 further comprising installing components of a telecommunication system in the slots.

20. The method of claim 16 further comprising forming the other slots on the electrical backplane symmetrically disposed relative to the slot for the distributor.

21. An optical bus assembly for communicating information between a plurality of components comprising:

an optical waveguiding plate attached to and mounted on a supporting structure;

the components generally symmetrically spaced from each other and coupled with the optical waveguiding plate;

one of the components comprising a distributor disposed proximate a midpoint of the waveguiding plate, wherein the distributor modifies a received optical signal and rebroadcasts the modified optical signal; and respective active optical elements coupled with each component to transmit and receive optical signals from the optical waveguiding plate and to convert the optical signals to electrical signals.

22. The optical bus assembly of claim 21 wherein each active optical element further comprises an optical transmitter coupled with the respective component to convert electrical signals from the respective component into optical signals and to transmit the optical signals to the waveguiding plate.

23. The optical bus assembly of claim 21 wherein each active optical elements further comprise an optical receiver coupled with the respective component to convert optical signals received from the waveguiding plate into electrical signals and to transmit the electrical signals to the respective component.

24. The optical bus assembly of claim 21 further comprising a hologram which functions as an optical beam splitter and an optical signal deflector disposed on the waveguiding plate adjacent to the distributor.

25. The optical bus assembly of claim 21 further comprising respective single holograms disposed on the optical waveguiding plate adjacent to the active optical elements of the components other than the distributor.

* * * * *